(12) United States Patent
Li et al.

(10) Patent No.: US 6,819,837 B2
(45) Date of Patent: Nov. 16, 2004

(54) METHOD OF TEMPORARILY ADJUSTING THE INDEX OF REFRACTION OF RING RESONATOR WITH PRECISION LASER MICROMACHINING

(75) Inventors: Ming Li, Chelmsford, MA (US); Daniel Hogan, Acton, MA (US); Xinbing Liu, Acton, MA (US); Makoto Ishizuka, Belmont, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 66 days.

(21) Appl. No.: 10/396,030

(22) Filed: Mar. 25, 2003

(65) Prior Publication Data

US 2003/0223695 A1 Dec. 4, 2003

Related U.S. Application Data

(60) Provisional application No. 60/384,575, filed on May 31, 2002.

(51) Int. Cl.[7] .................................................. G02B 6/26
(52) U.S. Cl. ............................. 385/39; 385/24; 372/20; 372/28; 372/94
(58) Field of Search .......................... 385/26, 30, 24, 385/28, 39, 40, 129–132; 372/6, 28, 20, 94, 102

(56) References Cited

U.S. PATENT DOCUMENTS

| | | |
|---|---|---|
| 4,695,121 A | 9/1987 | Mahapatra et al. |
| 5,446,579 A | 8/1995 | Lomashevitch |
| 6,078,605 A | 6/2000 | Little et al. |
| 6,356,681 B1 * | 3/2002 | Chen et al. .................. 385/37 |
| 6,411,752 B1 | 6/2002 | Little et al. |
| 2001/0004411 A1 | 6/2001 | Yariv |
| 2002/0094150 A1 | 7/2002 | Lim et al. |

OTHER PUBLICATIONS

Sai T. Chu et al.; "An Eight–Channel Add–Drop Filter Using Vertically Coupled Microring Resonators Over a Cross Grid"; IEEE Photonics Technology Letters, vol. 11, No. 6, Jun. 1999; pp. 691–693.

Sai T. Chu et al.; "Wavelength Trimming of a Microring Resonator Filter by Means of a UV Sensitive Polymer Overlay"; IEEE Phontonic Technology Letters, vol. 11, No. 6, Jun. 1999; pp. 688–690.

L. Huang et al.; "GaAs under Ultrafaxt Excitation: Response of the Dielectric Function"; Phys. Rev. Lett. 80 pp. 185–188; 1998.

* cited by examiner

Primary Examiner—Hemang Sanghavi
(74) Attorney, Agent, or Firm—RatnerPrestia

(57) ABSTRACT

A tuned optical resonator having a substrate and an input waveguide and an optical resonator waveguide formed on the substrate. The optical resonator waveguide has a resonant frequency, exhibits a first index of refraction, temporarily exhibits a second index of refraction responsive to application of laser energy, and temporarily resonates at the resonant frequency while the laser energy is being applied.

14 Claims, 2 Drawing Sheets

METHOD OF TEMPORARILY ADJUSTING THE INDEX OF REFRACTION OF RING RESONATOR WITH PRECISION LASER MICROMACHINING

CROSS REFERENCE TO RELATED APPLICATION

This application claims the benefit under Title 35 U.S.C. §119(e) of U.S. Provisional Application No. 60/384,575 filed on May 31, 2002, the contents of which are incorporated herein by reference.

FIELD OF THE INVENTION

The present invention relates to optical resonators. More particularly, it relates to optical resonators using ring resonators which may be temporarily tuned by the application of laser energy to resonate at a selected frequency. The invention also relates to methods of tuning the optical resonators to adjust the frequency at which resonance occurs.

BACKGROUND OF THE INVENTION

As technology advances, the volume of data around the world is growing at an exponential rate. Everything from increased usage of the global information networks (e.g., the Internet), video conferences, and mobile phones relies on efficient data transfer. Reductions in the distance that electrons need to travel within and between components have provided the dramatic increases in device speeds. Increases in the speed of electronic devices through the 1980s and 1990s largely resulted from reductions in size of microelectronic components. However, microelectronics communications networks have physical limitations that effectively limit the volume of data that can be transferred. As devices encroach upon the physical limits of component density and complexity, device reliability and speed advances for new devices are declining.

Optical communication of data (e.g., sending photons through optical fiber, rather than sending electrons through wire) is already widely implemented for certain connections and communications. Optical connections, optical switching, and all-optical circuits provide ways for photons to travel and be routed, in place of electrons traveling through electronic circuits. Wavelength division multiplexing (WDM) provides a way to send even more data through optical components (such as fiber) by mixing light of different frequencies in the same fiber. A demultiplexer separates a specific frequency of light from a fiber.

Photonic devices and microphotonics provide significant potential for furthering the advancement of technology devices historically served by microelectronics because they also enable large volumes of data to travel along optical fibers and be routed to their final destinations. A primary reason that all-optical circuits have not yet been implemented is that there are manufacturing problems related to photonic device fabrication, such as meeting index of refraction specifications related to making these photonic devices. The small feature size required for photonic devices, as well as small tolerances for physical specifications of photonic devices, have delayed the discovery and use of mass manufacturing techniques for these devices.

A ring resonator is a device that is designed to resonate at a specific frequency of light in order to enable the ring resonator to selectively couple light at the resonant frequency from an input waveguide to an output waveguide. Typically, light energy is coupled into the ring resonator via evanescent coupling. In this coupling mode, the ring resonator is placed in close proximity to but not touching either the input waveguide or the output waveguide. Another common configuration, however, is to have the ring resonator touching one or both of the input and output waveguides in which case, light is transferred via leaky-mode coupling. The light in the input waveguide that is not in resonance passes by the ring resonator with only a small transmission loss. Using this technique, a ring resonator functions as a passive router, routing an individual frequency of light (i.e. the resonant frequency) from the input waveguide onto a separate output waveguide. When multiple ring resonators are used, they function as multiple passive routers, routing a plurality of individual frequencies of a WDM light signal from an input waveguide onto separate output waveguides at the same individual frequencies.

Thus, ring resonator devices have two important attributes for optical communications, functionality and compactness. Functionality refers to the fact that a wide range of desirable filter characteristics can be synthesized by coupling multiple resonators. Compactness refers to the fact that ring resonators with radii of less than 25 $\mu$m can lead to large scale integration of devices with densities on the order of $10^4$ to $10^5$ devices per square centimeter.

It is desirable for ring resonators to be precisely tuned to achieve good discrimination between frequencies. A ring resonator may be designed to be in resonance at a specific frequency in order to enable the ring resonator to couple light signals at that frequency from an input waveguide to an output waveguide. Using a demultiplexer with ring resonators, the light of various frequencies may be separated when the light is incident upon the demultiplexer. A series of ring resonators may be used to separate the light at discrete frequencies, and route the discrete frequencies to specific devices for data handling and processing.

Ring resonators may be fabricated using known methods such as x-ray or optical lithography. X-ray and optical lithography allow manufacturers to create the very small feature sizes used to implant ring resonators. After ring resonators are manufactured, it may be desirable to tune the resonator to adjust its resonant frequency. Temperature control has been used as one possible tuning method. However, temperature change may not be localized enough to independently tune closely spaced devices. Ultraviolet light induced refractive index changes in a spin coated photosensitive polymer has also been used to tune resonators.

SUMMARY OF THE INVENTION

One embodiment of the invention is a tuned optical resonator comprising a substrate, an input waveguide formed on the substrate and an optical resonator waveguide formed on the substrate. The optical resonator waveguide has a resonant frequency, exhibits a first index of refraction, temporarily exhibits a second index of refraction responsive to application of laser energy and temporarily resonates at the resonant frequency at which the laser energy is being applied.

Another embodiment of the invention is a method of temporarily tuning an optical resonator having a substrate, an input waveguide, and an optical resonator waveguide exhibiting an inherent index of refraction coupled to the input waveguide. The method comprises measuring a resonance characteristic of the optical resonator, applying a first amount of laser energy to the optical waveguide to permanently change the inherent index of refraction to a first index of refraction and temporarily illuminating the resonator with a second amount of laser energy to change the first index of refraction to a second index of refraction while the optical resonator is being illuminated in order to temporarily tune the optical resonator to a desired resonance characteristic.

Another embodiment of the invention is an optical demultiplexer comprising a substrate, a first optical waveguide formed on the substrate, which guides a multiplexed light beam having at least one frequency of light. An optical device configured to receive the light beam from the first optical waveguide and temporarily tuned to receive and resonate at the at least one frequency of light and to temporarily route the at least one frequency of light. The optical device comprises an optical resonator formed on the substrate. The optical resonator is temporarily modified by application of laser energy to tune the resonant frequency of the optical resonator to the at least one frequency of light. The optical device also comprises a second optical waveguide formed on the substrate and configured to temporarily receive light at the at least one frequency of light from the optical resonator.

Yet another embodiment is an optical demultiplexer comprising an input optical waveguide carrying a plurality of frequencies of light, a plurality of optical devices configured to receive the light beam from the input optical waveguide. Each of the optical devices temporarily resonates at least one of the plurality of frequencies of light. There are also a plurality of output optical waveguides optically coupled to respective optical devices for temporarily receiving light at respective ones of the resonant frequencies.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention provides a way to temporarily tune an optical resonator (ring, disc or other shape) by adjusting the internal electric fields and, hence, the index of refraction of the resonator. Changes in the internal electric fields and resultant changes in the index of refraction of the material comprising the resonator cause changes to the behavior of light within that material. These changes affect the speed at which light propagates in the resonator and, so, affect its resonant frequency. As described below, the index of refraction of a material may also be changed by changing its lattice structure. The lattice structure of a crystalline material may be changed to a glass phase or a metallic phase. The lattice structure of an amorphous or glass material may be changed to a metallic phase. These phase changes do not occur instantaneously. Instead, there is a delay in the range of picoseconds before a change from one phase to another phase occurs. This delay occurs regardless of the direction of the phase change. For example, there is a delay when a crystalline material changes to a glass phase and there is a delay when the glass phase returns to the crystalline material structure. The same delays occur for changes from glass phase to metal phase and from metal phase back to glass phase. The lattice structure of any of these materials may also be changed by ablating the material.

The index of refraction of a ring, disc or other shape resonator may be precisely tuned so that resonance exists only for light in a narrow band of frequencies. As described below, the refractive index of the material from which ring resonators are made may be accurately and precisely adjusted.

Figure 1:
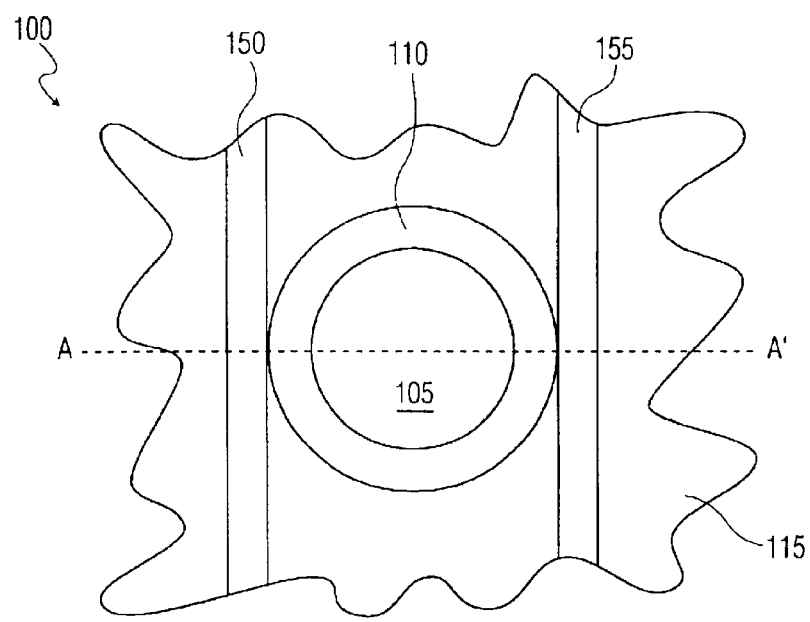
FIG. 1 is a top view of a portion of an exemplary photonic device having a ring resonator.

FIG. 1 shows a top view of a portion 100 of a photonic device including a ring resonator 110, a center 105, a substrate 115, a first waveguide 150, and a second waveguide 155. Although the invention is described in terms of a ring resonator, it is contemplated that it may be practiced using resonators having different shapes such as discs or even polygons. In ring or disc resonators, it is contemplated that the dominant mode for the resonant light is whispering gallery mode. For polygonal resonators, however, light may propagate via multiple reflections, for example from alternate sides of an octagonal structure.

Figure 2:
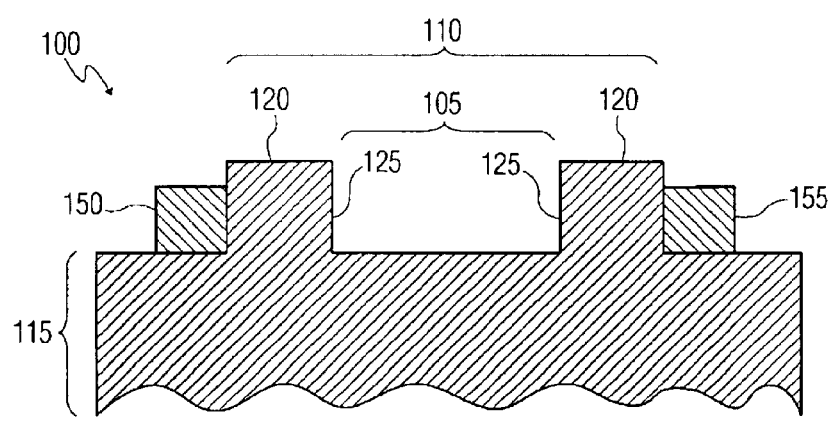
FIG. 2 is a cross-sectional view along line A–A' of FIG. 1.

FIG. 2 shows a cross-sectional view of portion 100 along line A–A' of FIG. 1, including the ring resonator 110. FIG. 2 shows a top layer 120, base layer 125 and center 105 of ring resonator 110. FIG. 2 also shows the first waveguide 150, the second waveguide 155, and the substrate 115. In an exemplary embodiment, top layer 120 may be made of silicon (Si) and base layer 125 may be made of $SiO_2$. In an alternative embodiment, top layer 120 may be made of GaAs and base layer 125 may be made of AlGaAs. In an exemplary embodiment of portion 100, ring resonator 110 may be an annulus. In alternative embodiments, ring resonator 110 need not be in the shape of an annulus. Other shapes are known in and supported by the literature in the art. Alternative shapes may be, for example, an oval, an ellipse or a stadium shape.

In an exemplary embodiment where the ring resonator may be an annulus, center 105 may have a diameter of approximately 3 to 5 microns. Also in an exemplary embodiment, top layer 120 may be a thin layer of single-crystal Si that may be 0.2 microns thick and 0.5 microns to 0.7 microns wide. Also in an exemplary embodiment, base layer 125 may be made of $SiO_2$ that may be greater than 0.5 microns thick. Since the $SiO_2$ layer needs to be thick enough to form a low index layer, 0.5 microns is a minimum desirable thickness for the base layer 125. The maximum thickness of the layer is governed only by the implementation of the process.

There are at least three reasons to use Si and $SiO_2$ for fabricating ring resonator 110 in an exemplary embodiment. First, Si is highly transparent to the infra-red frequencies used in optical communications (1.4–1.6 microns). Second, the index of refraction contrast between Si and $SiO_2$ is relatively large (about 2). As a result of the high contrast between the indices of refraction, the light is confined within the Si layer 120. The third reason is that there is a vast amount of industry knowledge, tools, and experience in Si-based device fabrication.

Substrate 115 may be composed of at least one layer of a material that may be identical to base layer 125. In alternate embodiments, substrate 115 may be made of a material that is different from the materials comprising top layer 120 and bottom layer 125. Each material may have a different lattice structure and a different index of refraction. In other embodiments, there may be additional layers made of different materials that compose substrate 115. Base layer 125 may be formed by removing material from the top of substrate 115 either by conventional masking and etching steps or by using laser ablation. First waveguide 150 and second waveguide 155 are conventional waveguides which may be made of the same material as the top layer 120. These waveguides may be used to carry light within optical communications systems.

In operation, portion 100 of the tuned optical resonator provides a way to route a specific frequency of light in an optical device. WDM provides for multiple frequencies of light to travel within first waveguide 150 according to conventional WDM practices. When a frequency of light that is the same as the resonance frequency of the ring resonator 110, the light travels within first waveguide 150 and is coupled into ring resonator 110. Because the light in the ring resonator 110 is in resonance, its power increases to a level sufficient to couple from the resonator into second waveguide 155. When the frequency of the light is not resonant with ring resonator 110, it travels within first waveguide 150 and passes by ring resonator 110 with little or no transmission loss. By using a series of distinct ring resonators 110, each of which is in resonance at a different frequency, demultiplexing can be achieved. First waveguide 150 and second waveguide 155 may be mounted on substrate 115. First waveguide 150 and second waveguide 155 may be coupled to ring resonator 110 via evanescent coupling or leaky mode coupling.

The inventors have determined that laser energy may be used to adjust the electron distribution or lattice structure of the ring resonator, and therefore its index of refraction. Intense femtosecond laser pulses excite the dense electron-hole plasma in a material, which causes changes in its band structure and can lead to structural transitions. A material such as GaAs may be subjected to various levels of laser energy. Studies of the impact of various levels of laser energy on GaAs material show that the fluence threshold for permanent damage to the material, $F_{th}$, is 1.0 kJ/m². That is, permanent damage is caused to a material when laser energy equal to or above the threshold level $F_{th}$ is applied to the material. Other levels of laser energy result in different effects upon the material. For example, laser energy substantially above $F_{th}$ results in vaporizing (ablating) the material, thereby leaving a hole in place of the vaporized material or otherwise modifying the shape of the material.

The present invention provides a way to tune the optical resonator 100. An exemplary method changes the index of refraction of the ring resonator 110 permanently by exposing it to laser energy. In an alternative embodiment, a portion of ring resonator 110 is exposed to the laser energy. In both embodiments, the amount of energy applied is below the threshold level of energy, $F_{th}$, of the material from which the ring resonator is made. Although the amount of applied energy may be sufficient to cause a change in the index of refraction, it may not be enough to cause damage to or to ablate even a portion of the ring resonator 110.

Top layer 120 may be highly absorptive of most types of ultrafast laser energy, although it is highly transparent to the frequencies used in optical communications. In an exemplary embodiment, a femtosecond pulse laser (not shown) with a wavelength of 0.8 microns may be used to tune the resonant structure of top layer 120. In this embodiment, the tuning may change the index of refraction of ring resonator 110 by 0.1%. In an exemplary embodiment, the laser beam may illuminate a portion of the ring resonator. In an alternative embodiment, laser energy may be applied to layer 125. In yet another alternative embodiment, the laser beam may illuminate all of ring resonator 110 at once, thereby causing a uniform change across ring resonator 110.

The inventors have discovered how to improve the temporary ON/OFF capabilities of a ring resonator. An article explaining the effect of laser energy upon a dielectric has been published on the website of the physics and astronomy department of the University of Tennessee. The article explains that the index of refraction can be expressed as $n = (e/e_0)^{1/2} = (1 + c(1) + c(3)~E^2)^{1/2} \approx n_0(1 + (c(3)~E^2/2n_0) = n_0 + n_2*I$, where c (1) represents the susceptibility, c(3) represents third order non-linear optical interactions, E represents the electric field and I represents the intensity of the light illuminating the material. This equation, describing the value of the index of refraction, n, of any material can be shortened to $n = n_0 + n_2*I + \ldots$ where $n_0$ and $n_2$ are expansion constants for each order of the index. In this equation, the value of $n_2$ is extremely small. Thus, in normal operating conditions the value $n_2*I$ is negligible. When there is no radiation incident upon the dielectric, I is zero and n is $n_0$, which is the base value of index of refraction of the material. When the material is irradiated with light energy, I is nonzero and the term $n_2*I$ has a value. When small amounts of light energy are applied to the material, the term $n_2*I$ is very small and therefore negligible.

If, however, a high intensity beam of laser energy shining on the material, the product of $n_2$ and I becomes significant. Accordingly, the $n_2*I$ term may become significant when a material is irradiated with laser energy from an ultrafast, femtosecond laser, which has a very high peak intensity. The equation shows that the product of $n_2$ and I impacts the value of the index of refraction n while the material is being illuminated with the high intensity laser energy and for a time on the order of picoseconds after the material is illuminated. Accordingly, when light from an ultrafast laser is incident upon a material, the index of refraction instantaneously changes the index of refraction to the value represented by the equation $n = n_0$ and $n_2*I$. Using a high intensity beam may result in a significant change in the index of refraction. A few picoseconds after the intense beam of laser energy is removed from the material, the index of refraction reverts to $n = n_0$ because I=0 and therefore the $n_2$ term drops out of the equation and has no influence on the value of the index of refraction.

Using these concepts, a pulse from an ultrafast laser may be applied to ring resonator 100 with an intensity that is below damage threshold $F_{th}$ in order to temporarily change the index of refraction of the material only so long as the laser energy is incident upon the material. In an exemplary embodiment, a 500 fs pulse may be used. In another embodiment, a 1 ps (1000 fs) pulse may be used. The exemplary embodiment of the invention may use different levels of energy and different wavelengths for the beam that is propagating through waveguide 150 than is being used to illuminate the ring resonator. More specifically, the energy propagating through waveguide 150 may be much lower than that used to illuminate the ring resonator so that the propagating light energy does not inadvertently change the index of refraction of the ring resonator. In addition, the frequency of the light propagating through waveguide 150 may be significantly different than the frequency of the beam used to shine on the ring resonator so that the resonator does not resonate at the illuminating wavelength and so that there is no intermodulation between the two beams of light.

In the exemplary embodiment, when the intense pulse of laser light is incident upon the ring resonator for 500 fs, the index of refraction of the material substantially instantaneously changes for the length of the pulse, that is, for 500 fs, and then reverts to the initial value of the index of refraction with a delay on the order of picoseconds. While the 500 fs pulse is incident upon the ring resonator and for a short time after the end of the pulse, the ring resonator transfers light energy at its adjusted resonant frequency to waveguide 155. After this interval, the ring resonator stops transferring the resonant light energy to waveguide 155. Accordingly, ring resonator 100 may be used as a ADD/DROP switch at least for the duration of the 500 fs pulse.

In an exemplary embodiment, a temporary change in the index of refraction may be implemented after the index of refraction of the ring resonator is permanently changed by any of the methods described above. Using this method, the ring resonator may be tuned, in an exemplary embodiment, to transmit a frequency that is within 1% of the frequency to be transmitted while the ring resonator is being temporarily tuned. In another embodiment, a temporary change in the index of refraction may be implemented without any previous permanent changes to the index of refraction of the ring resonator.

In an embodiment using transient changes to the index of refraction, ring resonator 110 acts as an ADD/DROP channel filter in WDM on a real-time basis. This technique represents a significant improvement over current WDM channel filters. In this embodiment, the resonator couples light from its input to its output only while laser light is being applied to the resonator. As described above, the resonator may be built so that it is initially tuned to transmit light at a frequency less than the resonant frequency but within 1% of the desired resonant frequency. When it is desired to transmit the desired frequency of light, laser energy may be temporarily applied to the resonator so that the resonator then temporarily transmits light at the desired frequency which may be within a range of 1% of the initially tuned frequency.

Figure 3:
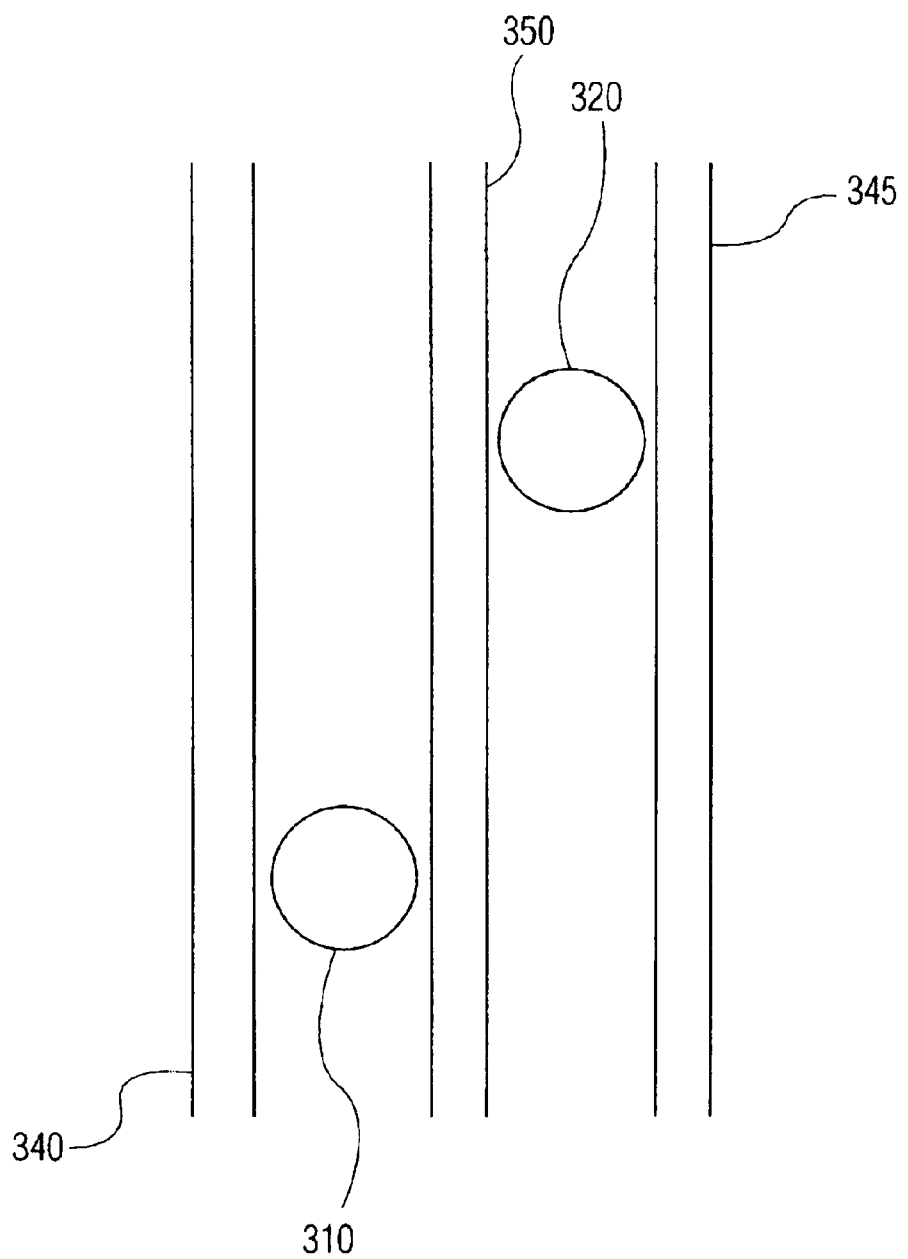
FIG. 3 is a top view of a portion of an exemplary photonic demultiplexer having two ring resonators.

This embodiment may be used as an element in an optical demultiplexer where one or more optical resonators, resonant at different frequencies, are coupled to multiplexed light propagating through an input waveguide. FIG. 3 shows an embodiment using more than one optical resonator. Referring to FIG. 3, multiple frequencies of light travel within input waveguide 350 according to conventional WDM practices. Positioned alongside waveguide 350 are resonators 310 and 320. In this exemplary embodiment the resonators are disc resonators. In alternative embodiments, additional resonators may be positioned alongside waveguide 350. Output waveguide 340 is positioned alongside resonator 310 and output waveguide 345 is positioned alongside resonator 320. Resonators 310 and 320 each may be tuned to temporarily resonate at different frequencies. Where additional resonators are used in alternative embodiments, each of the additional resonators may each temporarily resonate at different frequencies.

Initially, each of the resonators 310 and 320 is detuned; i.e., it is tuned off resonance so that it does not resonate light to its respective output waveguide 340 or 345. As multiplexed light propagates through input waveguide 350, laser light may be selectively, temporarily applied to one, or both, of the resonators 310, 320 to temporarily tune one or both of them. Temporary application of the proper amounts of laser energy to resonators 310 and/or 320 may tune one or both of them to temporarily resonate at their respective resonant frequencies, thereby causing one or both of them to transmit light at their respective resonant frequencies to their respective output waveguides 340 or 345.

In another alternative embodiment, a portion of substrate 115 may be exposed to laser energy in one or more amounts that may be sufficient to cause permanent and/or temporary changes to the lattice structure of the substrate and, thus, permanent and/or temporary changes to the index of refraction of the substrate. For permanent changes, before substrate 115 is exposed to laser energy, ring resonator 110 is masked via conventional methods in order to prevent the resonator from being exposed to any of the laser energy being applied to the substrate. The amount of laser energy applied to substrate 115 may not be enough to damage the substrate. In an exemplary embodiment, the laser energy is focused upon the center 105 of substrate 115.

In yet another embodiment, the index of refraction of the optical resonator 100 may be changed by implementing a method that combines other methods. In the first step, the index of refraction of ring resonator 110 may be permanently changed by exposing top layer 120 to a first amount of laser energy equal to or greater than $F_{th}$. In the second step, the index of refraction of substrate 115 may be permanently changed by exposing a portion of substrate 115 to a second amount of laser energy equal to or greater than $F_{th}$. The first amount of laser energy applied to ring resonator 110 may be larger than the second amount of laser energy that is applied to substrate 115. The first amount of laser energy may effect a larger or "coarse" change to the overall index of refraction of the optical resonator. The second amount of laser energy may effect a smaller change, thereby "fine-tuning" the overall index of refraction of the optical resonator 100. In this embodiment, the amount of energy applied in each step may be equal to or greater than $F_{th}$ for each the materials.

Additional steps, in the form of making temporary changes, may be implemented after the above permanent changes have been made. These additional steps may involve applying light energy to the material in an amount that is less than $F_{th}$. When intense light energy is applied to a material in an amount less than $F_{th}$, the lattice structure of the material may change after a time delay. The time delay may be in the range of picoseconds. Application of this intense light energy may change the phase of the material. As described above, the phase may change from a crystalline material to a glass phase and/or from a glass phase to a metal phase. When the intense light energy is removed from a material whose lattice structure has been changed to a different phase, the lattice structure of the material may change back to its original or inherent lattice structure, also after a time delay in the range of picoseconds.

In the third step, light energy may be applied before or after the material's lattice structure or electron distribution is changed. The light applied in the third step may instantaneously adjust the material's internal electric fields, as described above, and hence instantaneously change the index of refraction of the resonator. This third step may be used to further fine tune the resonator after the previous tuning steps have been implemented.

In the process of tuning a ring resonator, the first two steps are optional. If the instantaneous change in the index of refraction caused by altering the electrical field structure of the material is sufficient to cause the resonator to resonate at the desired frequency, only the third step may be used. If, however, this change is not sufficient, it may be desirable to either permanently or temporarily change the lattice structure of the material to change its index of refraction, such that, when the light energy of the third step is applied, the index of refraction of the resonator changes sufficiently to allow the ring to resonate at the desired frequency.

In further embodiments of the invention, different portions of ring resonator 110 may be exposed to different amounts of laser energy; different portions of top layer 120 may be exposed to different amounts of laser energy; different portions of bottom layer 125 may be exposed to different amounts of laser energy; and different portions of substrate 115 may be exposed to different amounts of laser energy. In all of these embodiments, when the first portion of material is exposed to the first amount of laser energy, it exhibits a modified lattice structure relative to the portions that have not been exposed to laser energy. Similarly, when the second portion of material is exposed to the second amount of laser energy, it also exhibits a modified lattice structure. Changes to the lattice structure of each portion simultaneously result in related changes to the indexes of refraction of the respective materials.

In yet another embodiment of the invention, the index of refraction of the ring resonator 110 may be changed by exposing it to an amount of laser energy that is sufficient to ablate a portion of the ring resonator. The amount of laser energy may be sufficiently in excess of $F_{th}$ to effect ablation.

The various embodiments may be used in the following manner. Once it has been determined which portions of the material may be illuminated with laser energy and the amount of laser energy that may be applied to the portion or portions, the initial resonance characteristic of the optical resonator may be measured. If the measurement shows that the resonator may resonate at a desired frequency, the resonator need not be modified. On the other hand, if it may not resonate at a desired frequency, then the chosen amount of laser energy may be applied to the chosen portion or portions of the material to tune the optical resonator close to the desired resonance characteristic. Accordingly, the chosen amount of laser energy may be applied to the first layer, or to the second layer, or to the substrate. Alternatively, respectively different chosen amounts of laser energy may be applied to any combination of two or more of the layers and the substrate.

Before the chosen amount of laser light is applied, light may be applied to the input waveguide of the optical resonator. In the exemplary embodiment, light may be applied via waveguide 150. The light applied to waveguide 150 may be at a predetermined monitoring frequency. As the light is applied to waveguide 150, it may or may not be at the resonant frequency of optical resonator 100. While the light at the monitoring frequency is propagating through waveguide 150 and through optical resonator 100, the light in output waveguide 155 is monitored to determine when it is at resonance. While monitoring the light in output waveguide 155, an additional amount of laser energy may be applied to the optical resonator until resonance at the predetermined monitoring frequency is achieved as indicated by the resonant output in waveguide 155. It will be understood that the laser energy may be applied to any of the portions of the optical resonator: top layer 120, bottom layer 125, or substrate 115. In the embodiment where substrate 115 is composed of more than one layer, the laser energy may be applied to any one of the substrate's layers.

After the ring resonator has been subjected to a coarse tuning and/or a fine tuning, and the above monitoring procedure has been performed an amount of laser energy may be applied to the ring resonator sufficient to further change its index of refraction only transiently. At the end of the transient period, the lattice structure, and consequently the index of refraction, returns to the state that existed prior to the application of the laser energy. In the transient case, ring resonator 110 may be exposed to laser energy with a fluence that is less than 1.0 $F_{th}$. When such an amount of laser energy is applied to at least one portion of ring resonator 110, the lattice structure and the index of refraction are transiently changed in the portion of the ring resonator.

As described above, application of laser energy in amounts below threshold level $F_{th}$ cause different changes to material, depending upon the amount of applied laser energy. In one embodiment, laser energy at about 0.5 $F_{th}$ may be applied to one of the materials comprising top layer 120 and/or bottom layer 125 and/or substrate 115. In another embodiment, laser energy about in the range of 0.6 to 0.8 $F_{th}$ may be applied to one or more of the crystalline materials, thereby transiently changing them to a glass phase. In yet another embodiment, laser energy about in the range of 0.8 to 1.0 $F_{th}$ may be applied to one or more of the materials, thereby transiently changing them to a metal phase.

Although the invention has been described in terms of exemplary embodiments, it is contemplated that it may be practiced as described above with variations within the scope of the appended claims.

What is claimed is:

1. An optical resonator comprising:
   a substrate;
   an input waveguide formed on the substrate; and
   an optical resonator waveguide optically coupled to the input waveguide, formed on the substrate, and having a base resonant frequency, where the resonator
   exhibits a first index of refraction,
   temporarily exhibits a second index of refraction while being illuminated by a first amount laser energy to resonate at a desired frequency different from the base resonant frequency.

2. An optical resonator according to claim 1, wherein the first index of refraction exhibited by the optical resonator waveguide has been modified, relative to an initial index of refraction of the optical resonator waveguide, by application of a second amount of laser energy.

3. An optical resonator according to claim 2, wherein the first index of refraction has been permanently modified by application of the second amount of laser energy.

4. An optical resonator according to claim 1, further comprising an ultrafast laser for temporarily applying the first amount of laser energy to the optical resonator waveguide.

5. The optical resonator of claim 1, wherein
   the ring resonator exhibits an optical breakdown threshold range of laser energy above which the first index of refraction is permanently changed, and
   the first amount that is less than the optical breakdown threshold range.

6. A method for temporarily tuning an optical resonator having a substrate, an input waveguide, and an optical resonator waveguide exhibiting a first index of refraction and optically coupled to the input waveguide, said method comprising:
   measuring a resonance characteristic of the optical resonator;

temporarily applying laser energy to at least the optical resonator waveguide to temporarily change the first index of refraction to a second index of refraction to tune the optical resonator to a desired resonant frequency while the laser energy is applied to at least the optical resonator.

7. A method for tuning an optical resonator to temporarily resonate at a desired frequency, the optical resonator being formed on a substrate and being coupled to an input waveguide, wherein the optical resonator waveguide exhibits an initial index of refraction, the method comprising the steps of:

measuring a resonance characteristic of the optical resonator;

applying a first amount of laser energy to at least the optical resonator waveguide to permanently change the initial index of refraction to a first index of refraction; and applying a second amount of laser energy to at least the optical resonator waveguide to temporarily change the first index of refraction to a second index of refraction and to temporarily tune the optical resonator to a resonate at the desired frequency while laser energy is applied to at least the optical resonator.

8. A method according to claim 7, wherein the step of applying the first amount of laser energy includes the step of applying laser energy in an amount at least about equal to an optical breakdown threshold range for permanently changing the index of refraction.

9. A method according to claim 7, wherein the ring resonator exhibits an optical breakdown threshold range of laser energy for permanently changing an inherent index of refraction of the ring resonator, and the step of applying the second amount of laser energy includes the step of applying the second amount of laser energy in an amount less than the optical breakdown threshold range.

10. An optical demultiplexer comprising:

a substrate;

a first optical waveguide formed on the substrate for guiding a multiplexed light beam having at least one frequency of light;

an optical resonator waveguide optically coupled to the input waveguide, formed on the substrate, and having a resonant frequency, where the resonator exhibits a first index of refraction, temporarily exhibits a second index of refraction while being illuminated by laser energy to resonate at the at least one frequency;

a second optical waveguide formed on the substrate and configured to temporarily receive light at the at least one frequency of light from the optical resonator.

11. The optical demultiplexer of claim 10, wherein the optical resonator is configured to receive the light from the first optical waveguide by leaky mode coupling.

12. The optical demultiplexer of claim 10, wherein the optical device is configured to receive the light from the first optical waveguide by evanescent coupling.

13. An optical demultiplexer comprising:

a input optical waveguide for guiding a multiplexed light beam transmitting a plurality of frequencies of light;

a plurality of optical resonators configured to receive the light beam from the input optical waveguide and configured to be illuminated by an amount of laser energy to temporarily resonate at respectively different ones of said plurality of frequencies of light while being illuminated by the amount of laser energy; and a plurality of output optical waveguides optically coupled to respective ones of said plurality of optical resonators for temporarily receiving light from the respective optical resonators while the optical resonators are illuminated by the amount of laser energy.

14. The optical demultiplexer of claim 13, wherein respective ones of the plurality of output waveguides are detuned; and further comprising means for selectively, temporarily applying laser energy to selected ones of the resonators to cause said selected ones of the resonators to temporarily resonate the respective one of said plurality of frequencies of light while laser energy is applied to at least the optical resonator.

* * * * *